(12) United States Patent
Khan

(10) Patent No.: US 10,171,476 B2
(45) Date of Patent: Jan. 1, 2019

(54) SYSTEM AND METHOD FOR PROTECTING THE PRIVACY OF IDENTITY AND FINANCIAL INFORMATION OF THE CONSUMER CONDUCTING ONLINE BUSINESS

(71) Applicant: Sal Khan, Ottawa (CA)

(72) Inventor: Sal Khan, Ottawa (CA)

( * ) Notice: Subject to any disclaimer, the term of this patent is extended or adjusted under 35 U.S.C. 154(b) by 0 days.

(21) Appl. No.: 15/044,055

(22) Filed: Feb. 15, 2016

(65) Prior Publication Data

US 2017/0324750 A1    Nov. 9, 2017

(51) Int. Cl.
*H04L 29/06*    (2006.01)
*H04W 12/06*    (2009.01)
*H04L 9/32*    (2006.01)

(52) U.S. Cl.
CPC .......... *H04L 63/123* (2013.01); *H04L 9/3247* (2013.01); *H04L 63/0807* (2013.01); *H04L 63/0853* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2006/0074986 A1* | 4/2006 | Mallalieu | ........... | G07C 9/00087 |
| 2007/0245144 A1* | 10/2007 | Wilson | ............... | G06F 21/6254 |
| | | | | 713/170 |
| 2008/0046984 A1* | 2/2008 | Bohmer | .............. | H04L 63/0853 |
| | | | | 726/5 |
| 2010/0194571 A1* | 8/2010 | Ortiz | ................... | H04L 63/0861 |
| | | | | 340/572.1 |
| 2012/0199653 A1* | 8/2012 | Wenzel | .............. | G07C 9/00087 |
| | | | | 235/382 |
| 2014/0270336 A1* | 9/2014 | Eckel | .................... | G06T 1/0021 |
| | | | | 382/100 |
| 2015/0058931 A1* | 2/2015 | Miu | ....................... | H04L 63/126 |
| | | | | 726/3 |
| 2015/0235215 A1* | 8/2015 | Kumar | .............. | G06Q 20/4014 |
| | | | | 705/44 |
| 2015/0319170 A1* | 11/2015 | Grossemy | ............... | G06F 21/31 |
| | | | | 713/186 |
| 2016/0065552 A1* | 3/2016 | Chen | ...................... | G06F 21/45 |
| | | | | 726/6 |

\* cited by examiner

*Primary Examiner* — Kenny S Lin

(57) ABSTRACT

The migration of identity documents, such as driving licenses, from physical documents to electronic documents creates new problems for those seeking to verify the identity of an individual based upon the electronic document they provide. However, the inventors have established a means of binding electronic documents and electronic representations of physical documents to individuals at issuance of the document(s). Accordingly, the inventors address identity verification by providing to those seeking to verify the individual's identity data allowing them to verify the presented electronic ID document. For example, a police officer requesting a driving license can obtain on their own electronic device through the methods of the invention the issued driving license associated with identifier information on the license provided by the individual. As such tampering with the license to change a name, date of birth, photo etc. will result in a visible mismatch to the police officer in comparing them.

18 Claims, 9 Drawing Sheets

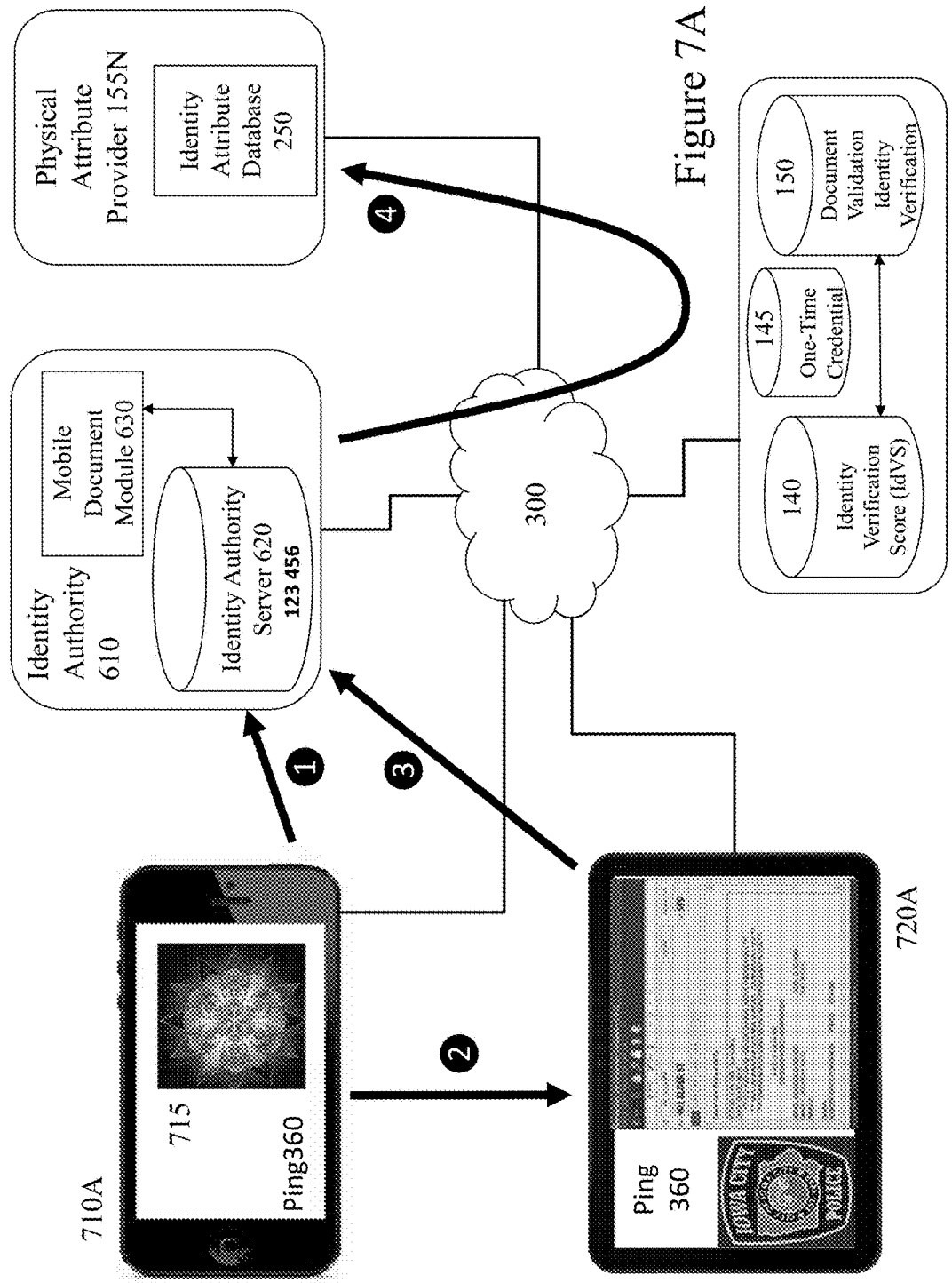

SYSTEM AND METHOD FOR PROTECTING THE PRIVACY OF IDENTITY AND FINANCIAL INFORMATION OF THE CONSUMER CONDUCTING ONLINE BUSINESS

FIELD OF THE INVENTION

This invention relates to personal identity management and more particularly to methods and systems for mobile personal credentials that are verifiable and authenticable.

BACKGROUND OF THE INVENTION

Digital identity is the data that uniquely describes a person or a thing and contains information about the subject's relationships within the digital world, commonly referred to as cyberspace, World Wide Web (WWW) or Internet. A critical problem is knowing the true identity with whom one is interacting either within electronic messaging, Internet accessible content, or transaction. Currently there are no ways to precisely determine the identity of a person in digital space. Even though there are identity attributes associated to a person's digital identity, these attributes or even identities can be changed, masked or dumped and new ones created. Despite the fact that there are many authentication systems and digital identifiers that try to address these problems, there is still a need for a unified and verified identification system. Further, there are still the needs for respecting the privacy of individuals, maintaining security of the elements of a digital identity and associating.

With the advent of widespread electronic devices, the landscape for the identity (ID) documents industry has been rapidly changing with increasingly sophisticated security measures, increased electronic processing, global wireless network connectivity, and continuously expanding machine readable capabilities globally. These have evolved in order to counter the increasingly sophisticated counterfeiting and piracy methodologies that exploit the very same advances in technology and infrastructure. At the same time user expectations from ubiquitous portable electronic devices, global networks, etc. is for simplified security processes and streamlined authentication of an ID document, the user, or a transaction by the user.

Security features of ID documents currently in use globally include visual security features, machine-readable security features, and embedded passive or active electronic circuits. Visual Security Features provide easy visual control of ID documents and make them more resistant to counterfeiting and tampering through attempts at both physical and data changes. Machine-readable Security Features traditionally include magnetic stripes, 1D and 2D barcodes, Optical Character Recognition (OCR)/Optically Machine Readable (OMR) content in printed areas or Machine Readable Zones (MRZs). More advanced ID documents may also include contact and contactless interfaces microchips including RFID and smart cards. Such Machine-readable Security Features have varying memory capacity and typically replicate digitally the document data with additional unique identifiers and, in the case of microchips with sufficient data storage capabilities, additional biometric identification data for holder authentication may be included.

However, many if not all of these security measures are bypassed, eliminated, or reduced in their efficacy when the ID document is also provided in an electronic format upon a user's portable electronic device. Such a transitioning of traditional physical ID documents to their electronic "virtual" counterparts is anticipated to follow the current transitioning of user's financial credentials into the virtual world allowing users to pay for services and/or goods within retail environments by direct wireless communications between their portable electronic device and the point of sale terminal. However, the tampering of ID documents which would be visible upon the physical ID document can be rendered invisible within the electronic ID document with relative ease and with a variety of online and/or downloadable graphics editing tools etc. Accordingly, the requirement exists to provide third parties with the ability to verify the electronic version of an ID document being presented to them as being valid and untampered.

Accordingly, the inventors address these issues through the provisioning of electronic ID documents which when presented to a third party are associated with provisioning of data to the third party that allows them to verify the presented electronic ID document. Further, the inventors by linking the electronic ID document to its physical ID document counterpart or tying the electronic ID document to the physical individual provide authenticable electronic ID documents.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations in the prior art relating to real world and virtual world identities and more particularly to authenticating users within the virtual world based upon credentials issued in response to validated and authenticated real world identities.

In accordance with an aspect of the invention there is provided a method comprising providing verification of an individual to a third party by providing to the third party a representation of the originally issued identity document associated with information provided by the individual during the verification process.

In accordance with an aspect of the invention the method further comprising that the representation of the originally issued identity document is provided to a first electronic device associated with the third party in a first message from a remote server based upon information provided to the third party by a second electronic device associated with the individual, or the representation of the originally issued identity document is provided to a first electronic device associated with the third party in a first message from a remote server based upon information provided by the third party to an application in execution upon a second electronic device associated with the individual.

In accordance with an aspect of the invention the method further comprising the representation of the originally issued identity document is at least one of a fractal image forming a predetermined portion of the originally issued identity document, and an image of the originally issued identity document redacted according to a privacy policy relating to personal data.

In accordance with an aspect of the invention there is provided a method comprising providing verification of an individual to a third party by providing to the third party first data and to the individual second data, each of the first data and second data generated in dependence upon third data provided by the individual to a web based verification application; wherein a predetermined portion of the second data forms a predetermined portion of the first data;

the third data was provided by the individual to the web based verification application via a first electronic device associated with the individual; and the first data was provided by the web based verification application to a second electronic device associated with the third party based upon the third data being initially provided to the third party by the individual and communicated to the web based verification application via the second electronic device.

In accordance with an aspect of the invention there is provided a method comprising providing to a first electronic device credential information relating to an individual associated with the first electronic device, the credential information authorizing submission of a first message to a remote server;

receiving upon the first electronic device first data, the first data provided by the remote server in response to the first message;

capturing upon a second electronic device associated with a third party seeking to verify an aspect of the identity of the individual a representation of the first data;

transmitting from the second electronic device a second message to the remote server, the second message containing a predetermined subset of the first data and relating to a request to retrieve a predetermined portion of at least one of an electronic identity document and a digital representation of a physical identity document associated with the credential information;

retrieving with the remote server in response to a request sent by the remote server second data relating to identity attribute information stored within a database associated with the issuer of the at least one of the electronic identity document and the digital representation of a physical identity document associated with the credential information;

transmitting to the first electronic device third data relating to the at least one of the electronic identity document and the digital representation of a physical identity document associated with the credential information; and transmitting to the second electronic device fourth data relating the at least one of the electronic identity document and the digital representation of a physical identity document associated with the credential information.

In accordance with an aspect of the invention the method further comprising that the third data is at least one of:

a privacy policy compliant redacted image of the at least one of the electronic identity document and the digital representation of a physical identity document associated with the credential information;

a unique fractal associated with the at least one of the electronic identity document and the digital representation of a physical identity document associated with the credential information;

a unique fractal generated by an issuer of the at least one of the electronic identity document and the digital representation of a physical identity document associated with the credential information in response to the request from the remote server; and a unique identification number generated by the remote server.

In accordance with an aspect of the invention the method further comprising the fourth data is at least one of:

an image of the at least one of the electronic identity document and the digital representation of a physical identity document associated with the credential information;

a privacy policy compliant redacted image of the at least one of the electronic identity document and the digital representation of a physical identity document associated with the credential information;

a unique fractal associated with the at least one of the electronic identity document and the digital representation of a physical identity document associated with the credential information;

a unique fractal generated by an issuer of the at least one of the electronic identity document and the digital representation of a physical identity document associated with the credential information in response to the request from the remote server;

a unique identification number generated by the remote server; and a predetermined portion of data stored by an issuer of the at least one of the electronic identity document and the digital representation of a physical identity document associated with the credential information.

In accordance with an aspect of the invention the method further comprising that the process terminates if the second message is not received by the remote server within a predetermined time period after its receipt of the first message.

In accordance with an aspect of the invention there is provided a method of validating a non-photographically based identity document by verifying a photographically based identity document presented at the same time as the non-photographically based identity document by the same user, the verification of the photographically based identity document being performed as per a process and/or system described within the specification.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 7A and 7B depict an exemplary process flow for establishing verification of a credential provided by a user within an environment according to an embodiment of the invention.

DETAILED DESCRIPTION

Figure 1:
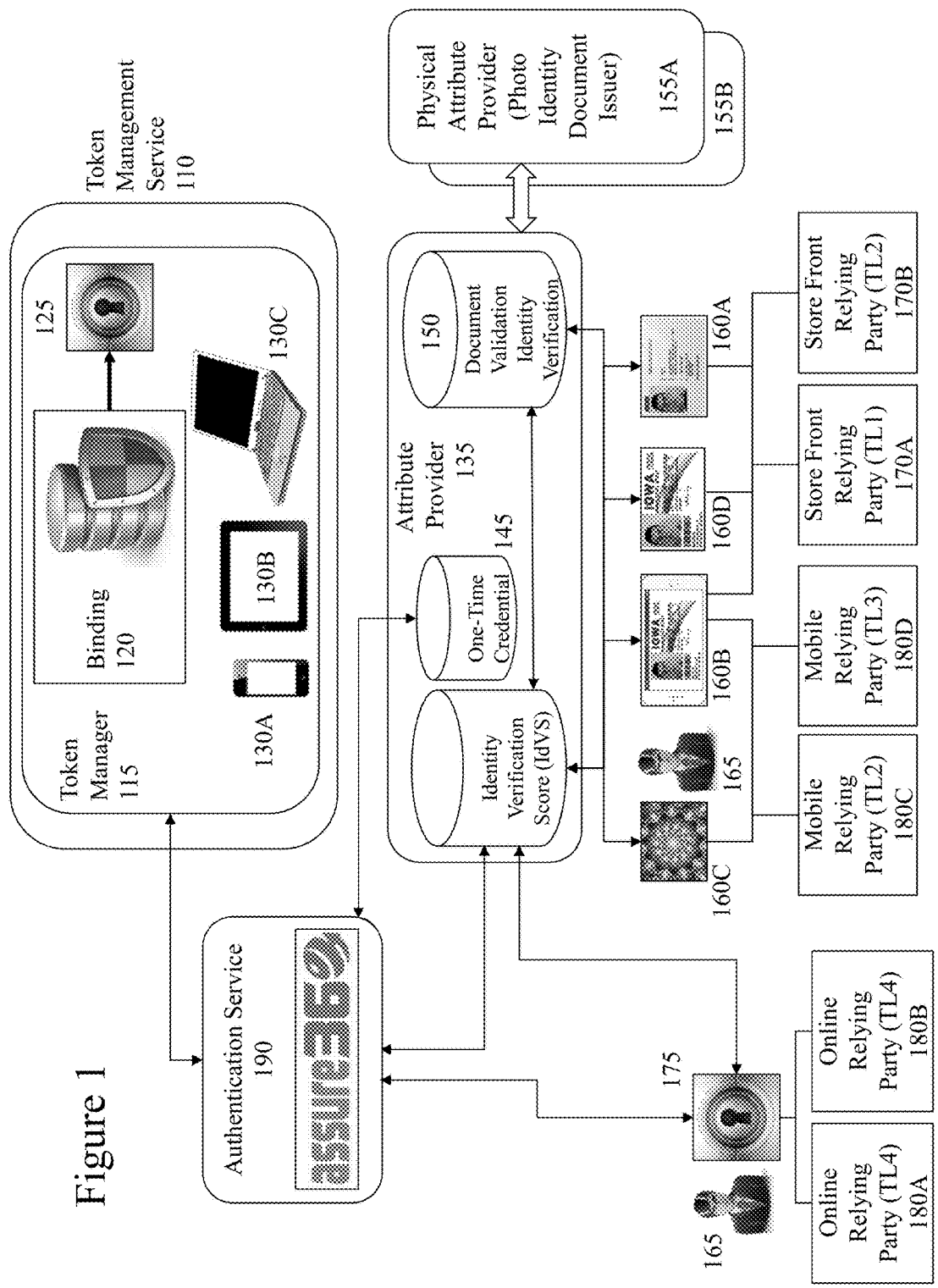
FIGS. 1 and 2 depict a first portion of a real world and virtual world identity ecosystem according to an embodiment of the invention.

The present invention is directed to real world and virtual world identities and more particularly to authenticating users within the virtual world based upon credentials issued in response to validated and authenticated real world identities.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, client, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" or "credential holder" as used herein refers to an individual who, either locally or remotely, by their engagement with a service provider, third party provider, enterprise, social network, social media etc. via a dashboard, web service, web site, software plug-in, software application, or graphical user interface provides an electronic credential as part of their authentication with the service provider, third party provider, enterprise, social network, social media etc. This includes, but is not limited to, private individuals, employees of organizations and/or enterprises, members of community organizations, members of charity organizations, men, women, children, and teenagers. "User information" as used herein may refer to, but is not limited to, user identification information, user profile information, and user knowledge.

A "security credential" (also referred to as a credential) as used herein may refer to, but is not limited to, a piece of evidence that a communicating party possesses that can be used to create or obtain a security token. This includes, but is not limited to, a machine-readable cryptographic key, a machine-readable password, a cryptographic credential issued by a trusted third party, or another item of electronic content having an unambiguous association with a specific, real individual. Such security credentials may include those that are permanent, designed to expire after a certain period, designed to expire after a predetermined condition is met, or designed to expire after a single use.

A "government issued photographic identity document" as used herein may refer to, but is not limited to, any document, card, or electronic content item issued by a government body for the purposes of identifying the owner of the government issued photographic identity document. Such government bodies may, for example, be provincial, federal, state, national, and regional governments alone or in combination. Such government issued photographic identity documents, also referred to within this specification as Photo-ID cards, government issued photographic cards, and government issued identity documents may include, but are not limited to, a driver's license, a passport, a health card, national identity card, and an immigration card although they have the common feature of a photographic image, multimedia image, or audiovisual image of the user to whom the government issued photographic identity document was issued. Such government issued photographic identity documents may include, but not be limited to, those comprising single sided plastic card, double sided plastic cards, single sided sheets, double side sheets, predetermined sheets within a book or booklet, and digital representations thereof in isolation or in combination with additional electronic/digital data that has been encoded/encrypted. For example, a digital memory with fingerprint scanner in the form of what is known as a "memory stick" may be securely issued by a government body as the fingerprint data for the user is securely encoded and uploaded together with image and digital content data. Subsequently, the digital memory when connected to a terminal and activated by the user's fingerprint may transfer the required digital data to the terminal to allow for a verification that the user is the one and the same. Such memory devices can be provided which destroy or corrupt the data stored within upon detection of tampering.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as those for example listed on Wikipedia (see http://en.wikipedia.org/wiki/List_of_file_formats). Within a broader approach digital content may include any type of digital information that is at least one of generated, selected, created, modified, and transmitted in response to a request, wherein said request may be a query, a search, a trigger, an alarm, and a message for example.

"Encryption" as used herein may refer to, but are not limited to, the processes of encoding messages or information in such a way that only authorized parties can read it. This includes, but is not limited to, symmetric key encryption through algorithms such as Twofish, Serpent, AES (Rijndael), Blowfish, CAST5, RC4, 3DES, and IDEA for example, and public-key encryption through algorithms such as Diffie-Hellman, Digital Signature Standard, Digital Signature Algorithm, ElGamal, elliptic-curve techniques, password-authenticated key agreement techniques, Paillier cryptosystem, RSA encryption algorithm, Cramer-Shoup cryptosystem, and YAK authenticated key agreement protocol.

The dual purposes of ID documents are to ascertain the virtual identity of the holder through providing a valid and authentic document, and also for a human authorized agent to identify the physical person as the rightful owner of the document, therefore binding in-person the physical identity to the virtual one. Whilst most security features are targeted at validating or increasing confidence in the authenticity of the ID document itself the second aspect of visual verification is subject to human limitations such as fatigue as well as variations in individual, environmental, and physical conditions. This is normally remedied by supplementing human validation with sophisticated equipment such as ID document scanners that perform automated OCR/OMR and data cross-checking, providing some level of validation automation. Further, given many security features involve micro-printing, NIR or UV markings, RFID, and smartcard microchips, it is safe to say that only such equipment can reliably read these and validate certain aspect of these. Within U.S. Provisional Patent Application 61/980,785 entitled "Methods and Systems relating to Real World Document Verification" filed Apr. 17, 2014 and 61/972,495 entitled "Methods and Systems relating to Real World and Virtual World Identities" filed Mar. 13, 2014, the entire contents of which are incorporated herein by reference, the inventors have presented a methodology and systems for uniquely verifying a physical ID card by establishing unique ID cards that are bound to a user's identity by an issuing authority. Accordingly, prior art identity replication and/or theft methodologies are halted as even a complete re-printing and re-programming of the ID card cannot remove the original binding of the ID card to an individual. However, it would be beneficial to expand the ID documents that could be protected by such unique bindings at issuance.

Conversely, the task of validating the physical identity of the ID document holder with the photo on the document, or the photo on another document of the same name such as a government issued ID, is optimally suited to the human agent today. As a biometric identifier, the matching of a user photo to their face is easily and quickly performed in person whereas with the current status of electronic solutions this is something more difficult to achieve reliably with facial recognition and face matching technology.

Accordingly, it would be beneficial for improved focus to be applied to photographic images within ID documents. As will become evident embodiments of the invention provide solutions supporting enhanced photographic and/or digital imagery to ensure enhanced usability for both visual authentication and easy readability without requiring high cost scanning or camera devices, allowing within the supported embodiments entirely digital mobile ID documents. Accordingly, embodiments of the invention may cross easily into the all-digital world whereas nearly all other prior art security features require a physical card making them self-limiting when considering migration to electronic ID documents and forcing adoption of secondary methodologies and credentials.

Figure 2:
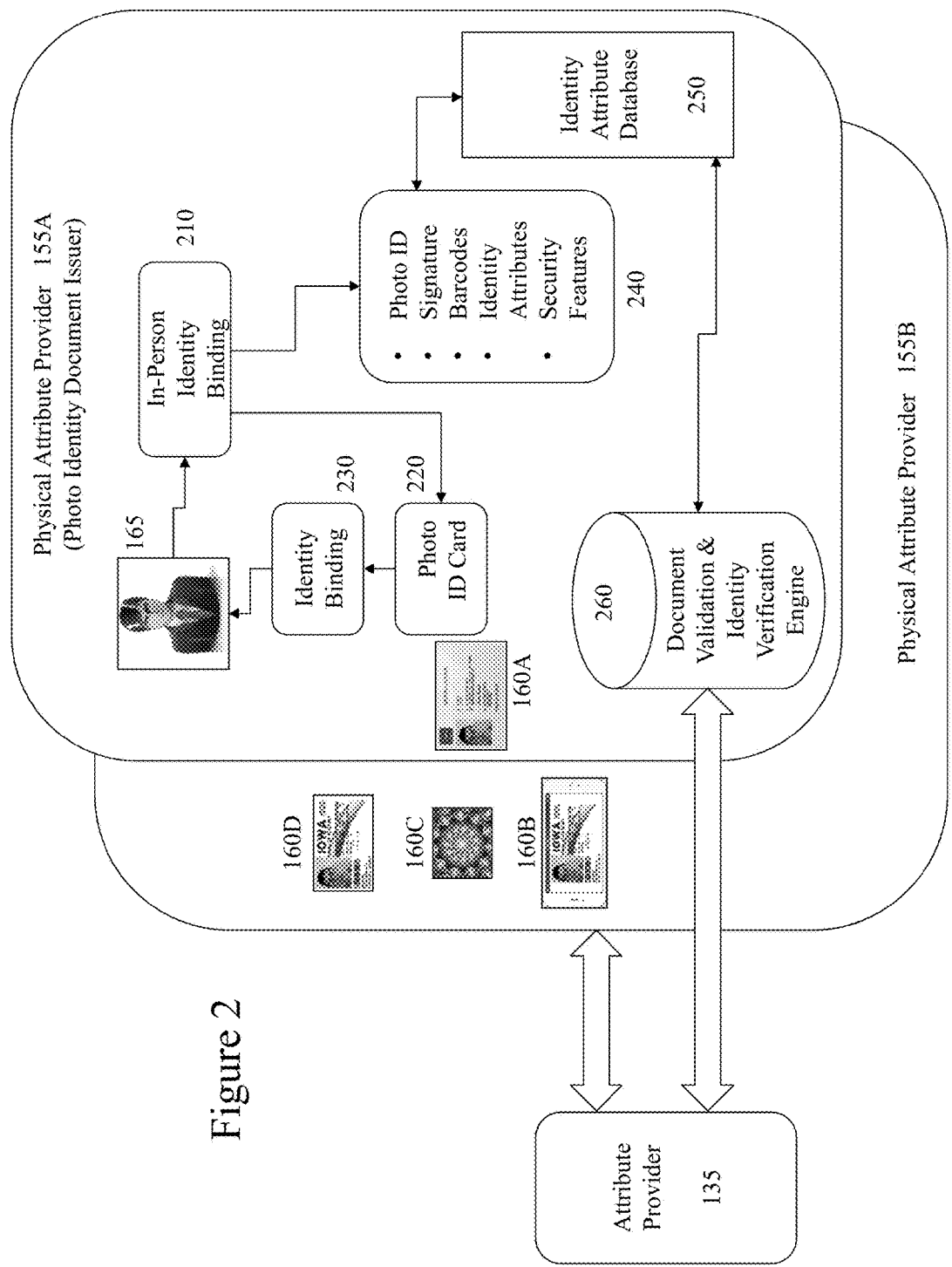

Referring to FIGS. 1 and 2 there are depicted first and second portions of a real and virtual world identity ecosystem (RVWIE) according to an embodiment of the invention. As depicted in FIG. 1 this RVWIE comprises a physical attribute provider (PHYSAP) 155 in communication with an Attribute Provider 135. The PHYSAP 155 being depicted schematic as process flow detail in FIG. 2. The PHYSAP 155 represents an identity document issuer wherein the identity document (ID) includes a photograph of the user 165 to whom it relates and may be a physical ID document and/or an electronic ID document. Accordingly, the PHYSAP 155 is, typically, a government issuing authority or an authority licensed by a government to issue identity documents. The government authority may be national, provincial, federal, or state for example. Such identity documents may include, but are not limited to, a driver's license, a passport, a health card, national identity card, and an immigration card.

Accordingly, a credential holder (user 165) is identity-proofed in-person by a trusted agent of the government photographic identity issuing authority, e.g. first and second PHYSAPs 155A and 155B. This process step 210, as depicted with respect to first PHYSAP 155A, results in the issuance of photographic identity (Photo-ID) document (PhysID) 160A (step 220) and the credential holder's proofed identity being bound (step 230) to the government photographic identity document. As a result of this sequence the credential holder's identity-proofed attributes being stored in step 240 within a government Identity Attribute Database 250 managed by the document issuer. Attributes stored in respect of the credential holder within the Identity Attribute Database 250 may include, but not be limited to, the photograph of the user 165, the signature of the user 165, the user's name and address, type of document, and date of issue. The information within the Identity Attribute Database 250 is also accessible by a Document Validation and Identity Verification Engine (DVIVE) 260 which is in communication with an Attribute Provider 135. In contrast, with second PHYSAP 155B, a similar process as depicted with respect to first PHYSAP 155A may be employed, resulting in a second PhysID 160D, electronic ID document (EleID) 160B, and fractal 160C. The fractal 160C may, for example be a fractal image or be a fractal image with embedded encrypted data such as described by the inventors within U.S. Provisional Patent Application 62/086,745 entitled "Verifiable Credentials and Methods Thereof" filed Dec. 3, 2014 the entire contents of which are incorporated herein by reference.

Subsequently, the user 165 (credential holder) uses their PhysID 160A, or second PhysID 160D at a storefront retailer/government office or kiosk/enterprise, depicted as first and second store front relying parties 170A and 170B respectively, to identify themselves in the presence of an agent of the store front relying party. The first and second store front relying parties 170A and 170B each exploit a Photo-ID checker, referred to within this specification as a Ping360 system/device. According to the identity of the first and second store front relying parties 170A and 170B respectively these are allocated different trust levels. For example:

Trust Level 1 (TL1)—government office, civic authority, e.g. another government Photo-ID issuing authority or government/civic office where the credential holder's identity is proofed, having higher trust level than other relying parties.

Trust Level 2 (TL2)—financial institutions, e.g. a bank, having a higher trust level than other relying parties, such as retailers, etc. but not at a level not as high as relying parties at a Trust Level 1.

Trust Level 3 (TL3)—all other identity agents, not included in the above trust levels 1 and 2 respectively.

An additional trust level, Trust Level 4 (TL4), is associated with online merchants as indicated in FIG. 1 with first and second online relying parties 180A and 180B respectively. This trust level, TL4, may also be associated with online activities with a government, government regulated body, online enterprise etc. Whilst embodiments of the invention are described as having four trust levels (TL1 to TL4 respectively) it would be evident that within alternate embodiments a higher or lesser number of trust levels may be employed. However, for each trust level the activities of a user are tracked and stored within the databases as described with respect to embodiments of the invention and employed as described below in generating an Identity Verification Score for the user with the government issued photographic identity document.

Whilst embodiments of the invention are described as having four trust levels (TL1 to TL4 respectively) it would be evident that within alternate embodiments a higher or lesser number of trust levels may be employed. The Ping360 system, located at the store front relying party's place of business and not shown for clarity, interacts with the Attribute Provider 135 to validate the PhysID 160A and verify the identity of the document bearer, user 165. Accordingly, the Ping360 system acquires data from and about the PhysID 160A and communicates this to a Document Validation Identity Verification database (DVIVDb) 150 which then communicates with the DVIVE 260 within the PHYSAP 155. The DVIVE 260 thereby confirms or denies the validity of the PhysID 160A presented by the user 165 at the one of the first and second store front relying parties 170A and 170B respectively. The DVIVE 260 extracts data from the Identity Attribute Database 250 as part of the validation activity.

Accordingly, the Ping360 system validates the PhysID 160A as being genuine or counterfeit. As described supra the Ping360 system extracts characteristic information from the PhysID 160A which is transmitted to the DVIVDb 150 managed and controlled by Attribute Provider 135. The extracted characteristics are then provided to DVIVE 260 wherein they are compared with data extracted from Identity Attribute Database 250 and a resulting validation/denouncement of the PhysID 160A is communicated back to the DVIVDb 150 and therein back to the Ping360 for presentation to the agent of the store front relying party. Extracted characteristics may include, but are not limited to, the photograph on the PhysID 160A, a signature, identity information of the PhysID 160A, barcode data, QR code data, data within magnetic stripe(s), etc. as well as potentially characteristics of the card itself.

The data within the Identity Attribute Database 250 maintained and acquired/generated by the PHYSAP 155 relating to the PhysID 160A when the user 165 applied for, or renewed, their PhysID 160A. Accordingly, the user 165 during the course of doing business at various retail service provider's locations, the credential holder's (user 165) PhysID 160A is validated and their identity verified by Attribute Provider's 135 DVIVDb 150. Therefore, each time the user's 165 PhysID 160A (or Photo-ID document) is validated and the bearer's identity is verified by the combination the Ping360 system, DVIVDb 150, and DVIVE 260 as being genuine and not fake, then the credential holder's in-person verified identity is also confirmed as being genuine. As depicted and described below in respect of FIG. 8 the Attribute Provider 135 also generates one or more Identity Verification Scores (IdVS) which are subsequently stored within an Identity Verification Score database 140. As a result, Ping360 software is able to generate a quantified measure of the credential holder's identity and inform participating businesses, employers, and organizations of the strength of the credential holder's identity.

An Identity Verification Score (IdVS) may be considered to be similar to a FICO score, which is used by financial institutions to help them make complex, high-volume decisions and grant credit to a user. As described in more detail below, and as established supra, in order to create a representative IdVS for each credential holder (user 165), where their PhysID 160A is verified by a Ping360 system, a trust level (TL) for each storefront relying party (Identity Agent) is established as outlined supra in dependence upon the storefront retailing party class, e.g. financial institutions have higher trust level than a retailer but not as high as a government office or civic authority office. In addition to trust level an IdVS computation according to embodiments of the invention may take into account the number of times the credential holder's photo-ID document is validated and the credential holder's identity verified.

As depicted in FIG. 1 IdVS data is also available for use by online relying parties, such as first and second online relying parties 180A and 180B respectively who may also act as identity agents for Attribute Provider 135. It is also available for use by online authentication services, such as for example, Authentication Service 190 depicted as Assure 360 Identity Assurance Service. The user 165, upon being verified through PHYSAP 155, may establish an account with an Attribute Provider 135 by forwarding an electronic mail address through an Identity Agent, depicted within FIG. 1 by first and second store front relying parties 170A and 170B respectively, via a Ping360 display, e.g. a tablet electronic device. The user 165 may have the ability to choose an Attribute Provider 135 from multiple Attribute Providers 135 as part of the process performed through an Identity Agent where they provide their electronic mail address. Optionally, the ability of a user 165 to communicate with and/or open an account with an Attribute Provider 135 may be restricted to a store front relying party at only one or more trust levels, e.g. those with trust level 1 (TL1) only for example. Additionally, the user 165 may be prevented from accessing an Identity Agent to establish the account with an Attribute Provider 135 until at least one or a predetermined number of activities have been completed with the store front relying parties at the appropriate trust levels. Further, the Identity Agent may only be accessed by the user 165 upon an authentication of their identity at the store front relying party by an action of an agent of the store front relying party.

The user 165 may then select an Authentication Service 190 from those provided by the Attribute Provider 135 web site of the Attribute Provider 135 the user 165 has selected. The Attribute Provider 135 sends a one-time-credential retrieved from One-Time Credential database 145 to the selected Authentication Service 190 and a credential 175 to the credential holder (user 165). Attribute Provider 135 also sends the Authentication Service 190 information required by the Authentication Service 190 to open an online account in the credential holder's name. Optionally, the user 165 may be presented with separate lists of Attribute Providers 135 and Authentication Services 190 during their establishment of the account or subsequently the user 165 may access any Authentication Service 190 rather than only a subset of them associated with the selected Attribute Provider 135. The credential holder can use the one-time credential sent by Attribute Provider 135 to identify themselves to the selected Authentication Service 190 to confirm the online account which was opened automatically on the credential holder's behalf by the Authentication Service 190 when the Authentication Service 190 received the one-time-credential and the credential holder's information necessary to open an account. Once the account with the Authentication Service 190 is active the credential holder can link their PED and/or FED to the Authentication Service 190's server by downloading the Authentication Service 190's client and related digital security certificates onto their PED and/or FED. A security certificate exchange takes place between the Authentication Service 190 and the Token Management Service 110, which may for example be upon a server associated with the Authentication Service 190 or may be upon a server associated with a third party. Accordingly, the Token Management Service 110 comprises a Token Manager 115 that binds, denoted by Binding 120, the digital security certificates 125 to the user's 160 PEDs/FEDs such as depicted by first to third devices 130A to 130C respectively.

As a result, the credential holder's identity is bound to the credential holder's PEDs and/or FEDs and to the Authentication Service 190/Token Management Service 110 thereby providing to one of the first and second online relying parties 180A and 180B respectively with strong authentication and Level 3, in-person, verified identity assurance. Based on the credential holder's IdVS, which is obtained from Identity Verification Score database 140 the Attribute Provider 135 can provide Authentication Service 190, and other authentication services, with revocation status information on the credential holder. Accordingly, the Authentication Service 190 may revoke, cancel, or not authenticate the security credential 175 of the user 165. It would be evident that in some embodiments of the invention the Authentication Service 190 does not retain or store the one-time credentials 175.

Figure 3:
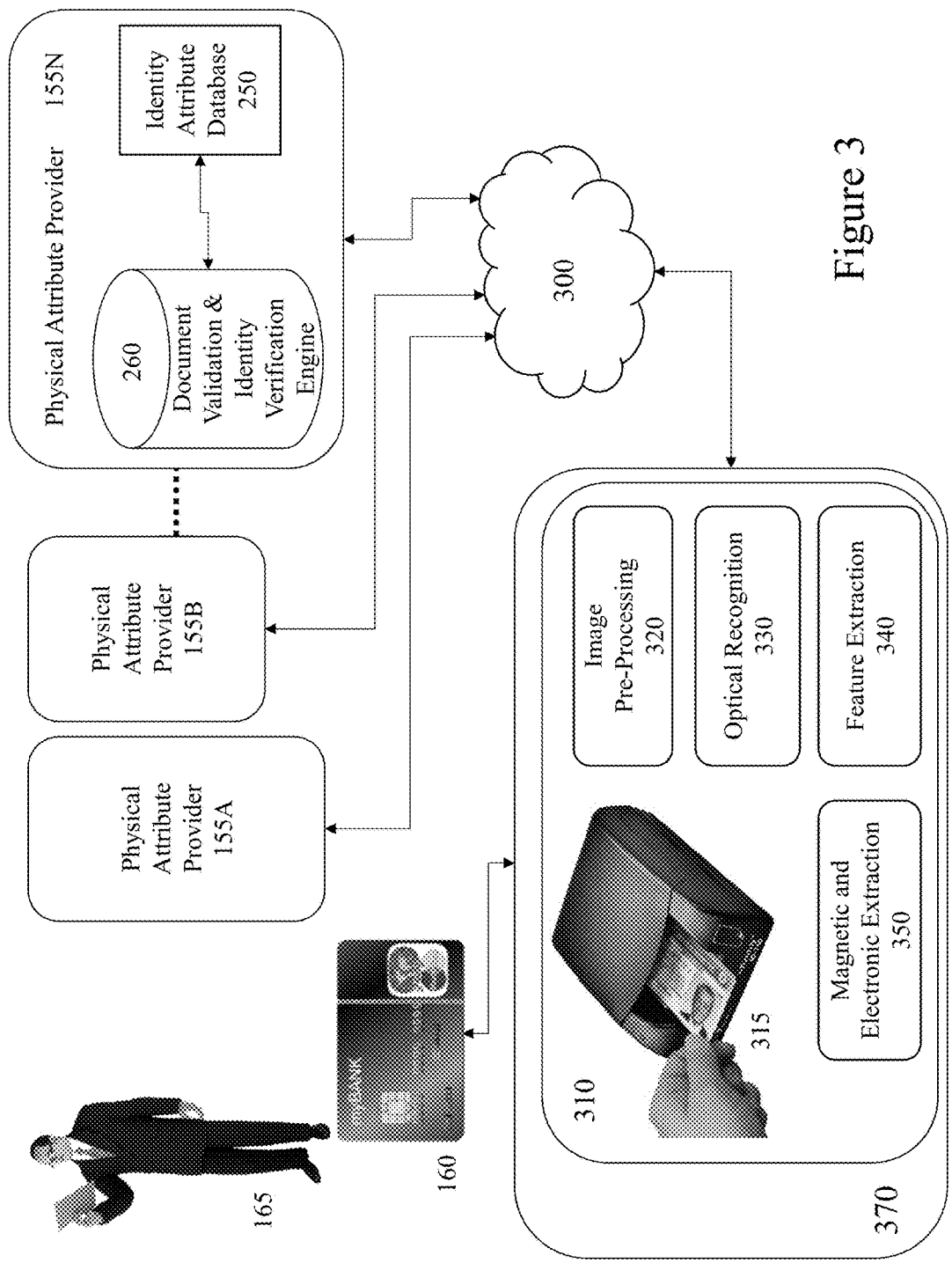
FIG. 3 depicts an identity document matching architecture at a store front relying party according to an embodiment of the invention.

Referring to FIG. 3 there is depicted a card credential matching architecture at a store front relying party according to an embodiment of the invention as part of a RVWIE such as depicted in FIGS. 1 and 2 respectively. Accordingly, part of the RVWIE is depicted by PHYSAPs 155A to 155N respectively in respect of a user 165 and their card credential 160. Accordingly, the user 165 visits a store front relying party 370, such as described supra in respect of FIGS. 1 and 2 respectively by first and second store front relying parties 170A and 170B respectively. Depicted as part of a store front relying party 370 is a CARd CRedential chECker (CAR-CREC) system 310 comprising in addition to the terminal 315 modules including, but not limited to, those providing image pre-processing 320, optical character recognition (OCR) 330, feature extraction 340, and magnetic/electronic extraction 350 for example. Accordingly, the user presents their card credential 160 at the store front relying party 270 wherein an agent of the store front relying party 370 inserts the card credential 160 into the terminal 315 wherein the image pre-processing 320, optical character recognition (OCR) 330, feature extraction 340, and magnetic/electronic extraction 350 modules extract their information wherein this is communicated via network 300 to an appropriate one of the PHYSAPs 155A to 155N respectively via an Attribute Provider, not shown for clarity. For example, if the card credential 160 is a California driver's license then the PHYSAP may be part of the California Department of Motor Vehicles or alternatively if the card credential 160 is a US passport then the PHYSAP may be associated with the US Department of State.

The information derived from the card credential 160 by the CARCREC system 310 are communicated to a DVIVE 260 within PHYSAP 155 which extracts information from the Identity Attribute Database 250 in dependence upon elements of the extracted information to establish whether the user 265 is the legitimate owner of the card credential 160 or not. The resulting determination is then provided back to the CARCREC system 310 via the Attribute Provider, not shown for clarity, for display to the agent of the store front relying party 370.

Figure 4:
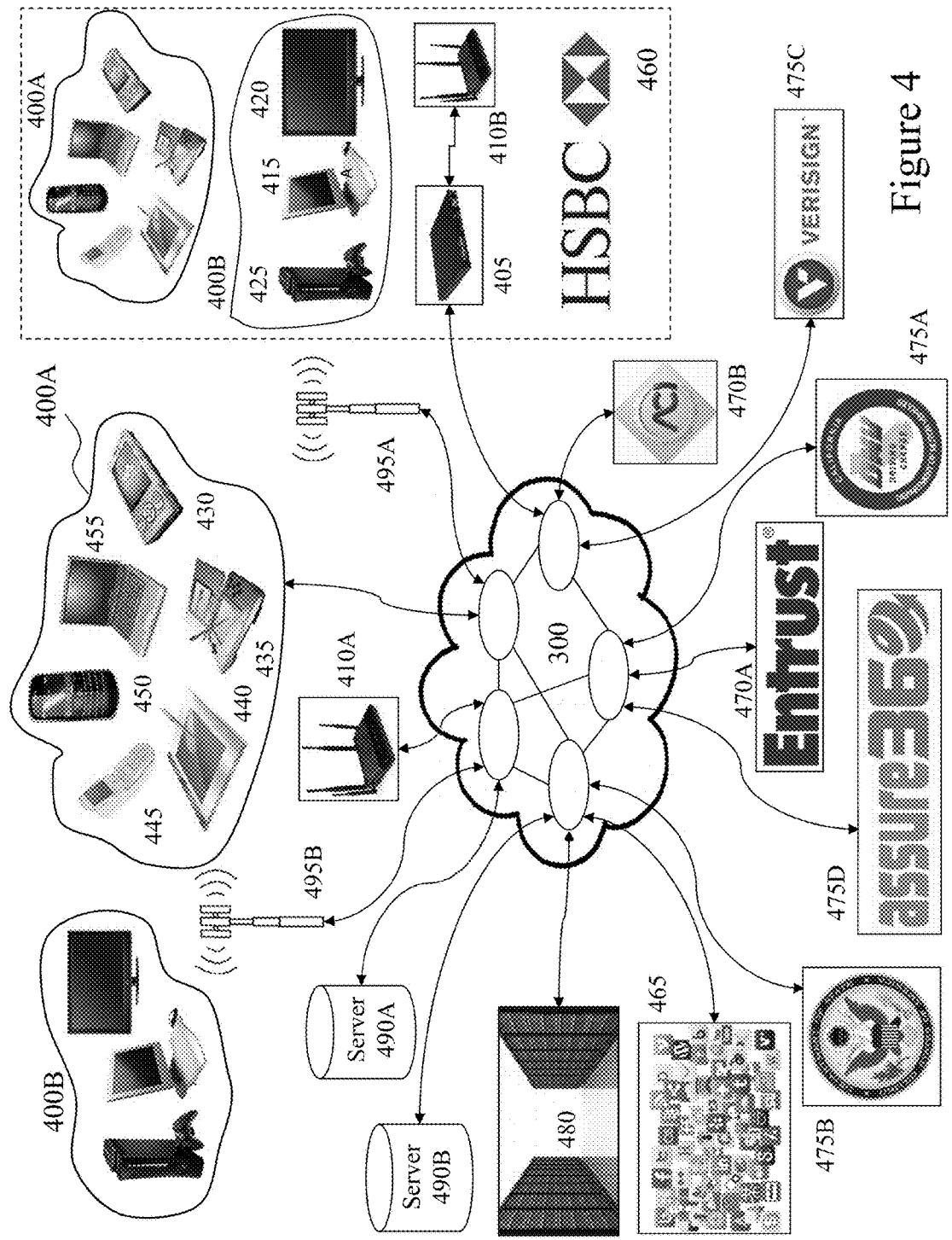
FIG. 4 depicts a network environment within which embodiments of the invention may be employed.

Referring to FIG. 4 there is depicted a network 100 within which embodiments of the invention may be employed supporting real world and virtual world identity ecosystems (RVWIEs) according to embodiments of the invention. Such RVWIEs, for example supporting activities such as the establishment of real world identity assurance, Level 3 assurance to physical store front relying enterprises, the binding of real world identity to electronic devices, and the provisioning of Level 3 identity verification to online retail relying enterprises. As shown first and second user groups 400A and 400B respectively interface to a telecommunications network 100. Within the representative telecommunication architecture, a remote central exchange 480 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 480 is connected via the network 100 to local, regional, and international exchanges (not shown for clarity) and therein through network 100 to first and second cellular APs 495A and 495B respectively which provide Wi-Fi cells for first and second user groups 400A and 400B respectively. Also connected to the network 100 are first and second Wi-Fi nodes 410A and 410B, the latter of which being coupled to network 100 via router 405. Second Wi-Fi node 410B is associated with Enterprise 460, e.g. HSBC™, within which other first and second user groups 400A are and 400B. Second user group 400B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 405.

Within the cell associated with first AP 410A the first group of users 400A may employ a variety of PEDs including for example, laptop computer 455, portable gaming console 435, tablet computer 440, smartphone 450, cellular telephone 445 as well as portable multimedia player 430. Within the cell associated with second AP 410B are the second group of users 400B which may employ a variety of FEDs including for example gaming console 425, personal computer 415 and wireless/Internet enabled television 420 as well as cable modem 405. First and second cellular APs 495A and 495B respectively provide, for example, cellular GSM (Global System for Mobile Communications) telephony services as well as 3G and 4G evolved services with enhanced data transport support. Second cellular AP 495B provides coverage in the exemplary embodiment to first and second user groups 400A and 400B. Alternatively the first and second user groups 400A and 400B may be geographically disparate and access the network 100 through multiple APs, not shown for clarity, distributed geographically by the network operator or operators. First cellular AP 495A as show provides coverage to first user group 400A and environment 470, which comprises second user group 400B as well as first user group 400A. Accordingly, the first and second user groups 400A and 400B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 400A may form associations either through standards such as IEEE 802.15 and Bluetooth as well in an ad-hoc manner.

Also connected to the network 100 are Social Networks (SOCNETS) 465, first and second Attribute Providers 470A and 470B respectively, e.g. Entrust™ and ACI Worldwide™ first and second government photographic identity providers 475A and 475B respectively, e.g. California Department of Motor Vehicles and US Department of State, and first and second Authentication Services 475C and 475D respectively, e.g. Verisign™ and Assure360™, as well as first and second servers 490A and 490B which together with others, not shown for clarity. First and second servers 490A and 490B may host according to embodiments of the inventions multiple services associated with a provider of publishing systems and publishing applications/platforms (RVWIEs); a provider of a SOCNET or Social Media (SOME) exploiting RVWIE features; a provider of a SOCNET and/or SOME not exploiting RVWIE features; a provider of services to PEDS and/or FEDS; a provider of one or more aspects of wired and/or wireless communications; an Enterprise 460 exploiting RVWIE features; license databases; content databases; image databases; content libraries; customer databases; websites; and software applications for download to or access by FEDs and/or PEDs exploiting and/or hosting RVWIE features. First and second primary content servers 490A and 490B may also host for example other Internet services such as a search engine, financial services, third party applications and other Internet based services.

Accordingly, a user may exploit a PED and/or FED within an Enterprise 460, for example, and access one of the first or second servers 490A and 490B respectively to perform an operation such as accessing/downloading an application which provides RVWIE features according to embodiments of the invention; execute an application already installed providing RVWIE features; execute a web based application providing RVWIE features; or access content. Similarly, a user may undertake such actions or others exploiting embodiments of the invention exploiting a PED or FED within first and second user groups 400A and 400B respectively via one of first and second cellular APs 495A and 495B respectively and first Wi-Fi nodes 410A.

As noted supra first and second servers 490A and 490B together with others may host a variety of software systems and/or software applications supporting embodiments of the invention. However, embodiments of the invention may not only operate locally, regionally, or nationally but internationally and globally. Accordingly, some servers may manage and control operations in execution upon other servers. For example, an Authentication Service such as Authentication Service 190 in FIG. 1 (e.g. Assure360) may operate a server or servers within one or more jurisdictions which authenticate, using one or more machine authentications techniques servers, within that jurisdiction as well as other jurisdictions. Each jurisdiction server may be operated by the same Authentication Service as manages the supervisory servers or it may be operated by one or more Identity Authority Servers authorised by the Authentication Service managing the supervisory servers. Optionally, such providers of Authentication Services may be regulated by government regulatory bodies within their respective jurisdictions. As noted supra as the verification processes are performed on firewalled servers associated with the physical attribute provider (PHYSAPs) then data relating to true original government issued photographic identity documents is maintained secure and private whilst the only information transmitted from a store front relying party is the extracted data for the presented government issued photographic identity document and that transmitted from a PHYSAP is the result of the verification/validation process. Similarly, data transmitted from an Attribute Provider is restricted, e.g. only the Identity Verification Score (IdVS) provided from the Attribute Provider server, e.g. Ping360 server, to the card reader at the store front relying party, e.g. Store Front Relying Party (TL1) 170A.

Accordingly, where government issued photographic identity cards are standardized, e.g. driver' licenses in all member states of the European Community, then the processes relating to the store front relying parties may be similarly tracked and employed across multiple jurisdictions. Alternatively, the user may transact business within another jurisdiction based upon the validation and verification of their identity. In such instances where a jurisdiction server (e.g. a country server) is transacting on behalf of a user (e.g. doing business or presenting their government issued photographic identity card) in another jurisdiction (e.g. country) then the two jurisdiction servers will first identify themselves before the user's digital identity will be assured by the jurisdiction server in the jurisdiction they live. Due to different provincial, state, territorial, differences such jurisdictions may include different states, regions, territories, etc., for example.

It would be evident that authentication may be conducted by an online relying party in the country in which the user is conducting business or by the user's Identity Provider (if the user uses one), if the online relying party the user is transaction with is networked with the user's Identity Provider. It would be evident that some enterprises and/or organizations acting as online relying parties, e.g. Google, American Express, HSBC and Facebook, may act as global identity providers whereas other online relying parties, e.g. Verizon and Chase Manhattan, may be only US identity providers.

Within the embodiments of the invention where an activity is defined with respect to a Store Front Relying Party 170A/170B or Online Relying Party 180A/180B then similar information and/or processes may be implemented with respect a Mobile Relying Party 180C/180D in that they may be provided within verification information such as IdVS etc. Similarly, presentation of their online electronic credential/electronic identity document may be, as described below in respect of FIGS. 6 and 7, employed without transfer to the mobile relying party 180C/180D but in other embodiments of the invention the mobile relying party 180C/180D may capture an image of the electronic credential/electronic identity document.

Figure 5:
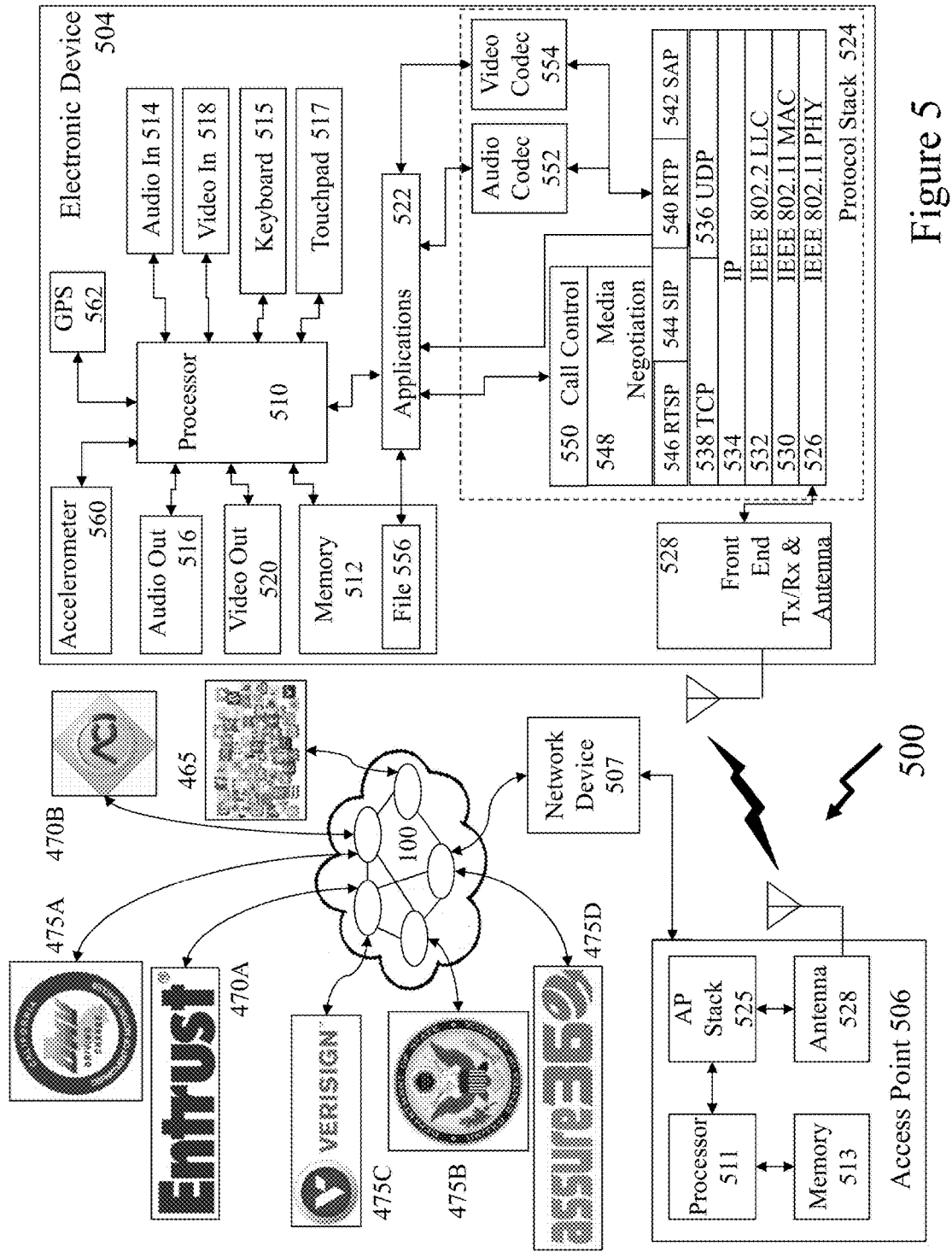
FIG. 5 depicts a wireless portable electronic device supporting communications to a network such as depicted in FIG. 4 and as supporting embodiments of the invention.

Now referring to FIG. 5 there is depicted an electronic device 504 and network access point 507 supporting RVWIE features according to embodiments of the invention. Electronic device 504 may, for example, be a PED and/or FED and may include additional elements above and beyond those described and depicted. Also depicted within the electronic device 504 is the protocol architecture as part of a simplified functional diagram of a system 500 that includes an electronic device 504, such as a smartphone 455, an access point (AP) 506, such as first AP 410, and one or more network devices 507, such as communication servers, streaming media servers, and routers for example such as first and second servers 490A and 490B respectively. Network devices 507 may be coupled to AP 506 via any combination of networks, wired, wireless and/or optical communication links such as discussed above in respect of FIG. 4 as well as directly as indicated. Network devices 507 are coupled to network 100 and therein Social Networks (SOCNETS) 465, first and second Attribute Providers 470A and 470B respectively, e.g. Entrust™ and ACI Worldwide™, first and second government photographic identity providers 475A and 475B respectively, e.g. California Department of Motor Vehicles and US Department of State, and first and second Authentication Services 475C and 475D respectively, e.g. Verisign™ and Assure 360™.

The electronic device 504 includes one or more processors 510 and a memory 512 coupled to processor(s) 510. AP 506 also includes one or more processors 511 and a memory 513 coupled to processor(s) 510. A non-exhaustive list of examples for any of processors 510 and 511 includes a central processing unit (CPU), a digital signal processor (DSP), a reduced instruction set computer (RISC), a complex instruction set computer (CISC) and the like. Furthermore, any of processors 510 and 511 may be part of application specific integrated circuits (ASICs) or may be a part of application specific standard products (ASSPs). A non-exhaustive list of examples for memories 512 and 513 includes any combination of the following semiconductor devices such as registers, latches, ROM, EEPROM, flash memory devices, nonvolatile random access memory devices (NVRAM), SDRAM, DRAM, double data rate (DDR) memory devices, SRAM, universal serial bus (USB) removable memory, and the like.

Electronic device 504 may include an audio input element 514, for example a microphone, and an audio output element 516, for example, a speaker, coupled to any of processors 510. Electronic device 504 may include a video input element 518, for example, a video camera or camera, and a video output element 520, for example an LCD display, coupled to any of processors 510. Electronic device 504 also includes a keyboard 515 and touchpad 517 which may for example be a physical keyboard and touchpad allowing the user to enter content or select functions within one of more applications 522. Alternatively, the keyboard 515 and touchpad 517 may be predetermined regions of a touch sensitive element forming part of the display within the electronic device 504. The one or more applications 522 that are typically stored in memory 512 and are executable by any combination of processors 510. Electronic device 504 also includes accelerometer 560 providing three-dimensional motion input to the process 510 and GPS 562 which provides geographical location information to processor 510.

Electronic device 504 includes a protocol stack 524 and AP 506 includes a communication stack 525. Within system 500 protocol stack 524 is shown as IEEE 802.11 protocol stack but alternatively may exploit other protocol stacks such as an Internet Engineering Task Force (IETF) multimedia protocol stack for example. Likewise, AP stack 525 exploits a protocol stack but is not expanded for clarity. Elements of protocol stack 524 and AP stack 525 may be implemented in any combination of software, firmware and/or hardware. Protocol stack 524 includes an IEEE 802.11-compatible PHY module 526 that is coupled to one or more Front-End Tx/Rx & Antenna 528, an IEEE 802.11-compatible MAC module 530 coupled to an IEEE 802.2-compatible LLC module 532. Protocol stack 524 includes a network layer IP module 534, a transport layer User Datagram Protocol (UDP) module 536 and a transport layer Transmission Control Protocol (TCP) module 538.

Protocol stack 524 also includes a session layer Real Time Transport Protocol (RTP) module 540, a Session Announcement Protocol (SAP) module 542, a Session Initiation Protocol (SIP) module 544 and a Real Time Streaming Protocol (RTSP) module 546. Protocol stack 524 includes a presentation layer media negotiation module 548, a call control module 550, one or more audio codecs 552 and one or more video codecs 554. Applications 522 may be able to create maintain and/or terminate communication sessions with any of devices 507 by way of AP 506. Typically, applications 522 may activate any of the SAP, SIP, RTSP, media negotiation and call control modules for that purpose. Typically, information may propagate from the SAP, SIP, RTSP, media negotiation and call control modules to PHY module 526 through TCP module 538, IP module 534, LLC module 532 and MAC module 530.

It would be apparent to one skilled in the art that elements of the electronic device 504 may also be implemented within the AP 506 including but not limited to one or more elements of the protocol stack 524, including for example an IEEE 802.11-compatible PHY module, an IEEE 802.11-compatible MAC module, and an IEEE 802.2-compatible LLC module 532. The AP 506 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 504 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

As described supra the user 165 may present their first or second PhysIDs 160A and 160D respectively at a storefront retailer/government office or kiosk/enterprise, depicted as first and second store front relying parties 170A and 170B respectively, to identify themselves in the presence of an agent of the store front relying party. In these instances the first and second store front relying parties 170A and 170B each exploit a Photo-ID checker, referred to within this specification as a Ping360 system/device, to capture information from the first or second PhysID 160A and 160D respectively, which is then employed as described supra in respect of FIGS. 1 and 2 or FIG. 3, to verify the identity of the user 165 presenting the first or second PhysID 160A and 160D respectively and/or verify that the first or second PhysID 160A and 160D respectively presented is itself valid. Alternatively, the user 165 may present their EleID 160B to first and second store front relying parties 170A and 170B respectively resulting in the process flow described and depicted in respect of FIGS. 6A and 6B respectively or the user 165 may present their EleID 160B to first and second mobile relying parties 180C and 180D respectively resulting in the process flow described and depicted in respect of FIGS. 7A and 7B respectively.

Figure 6A:
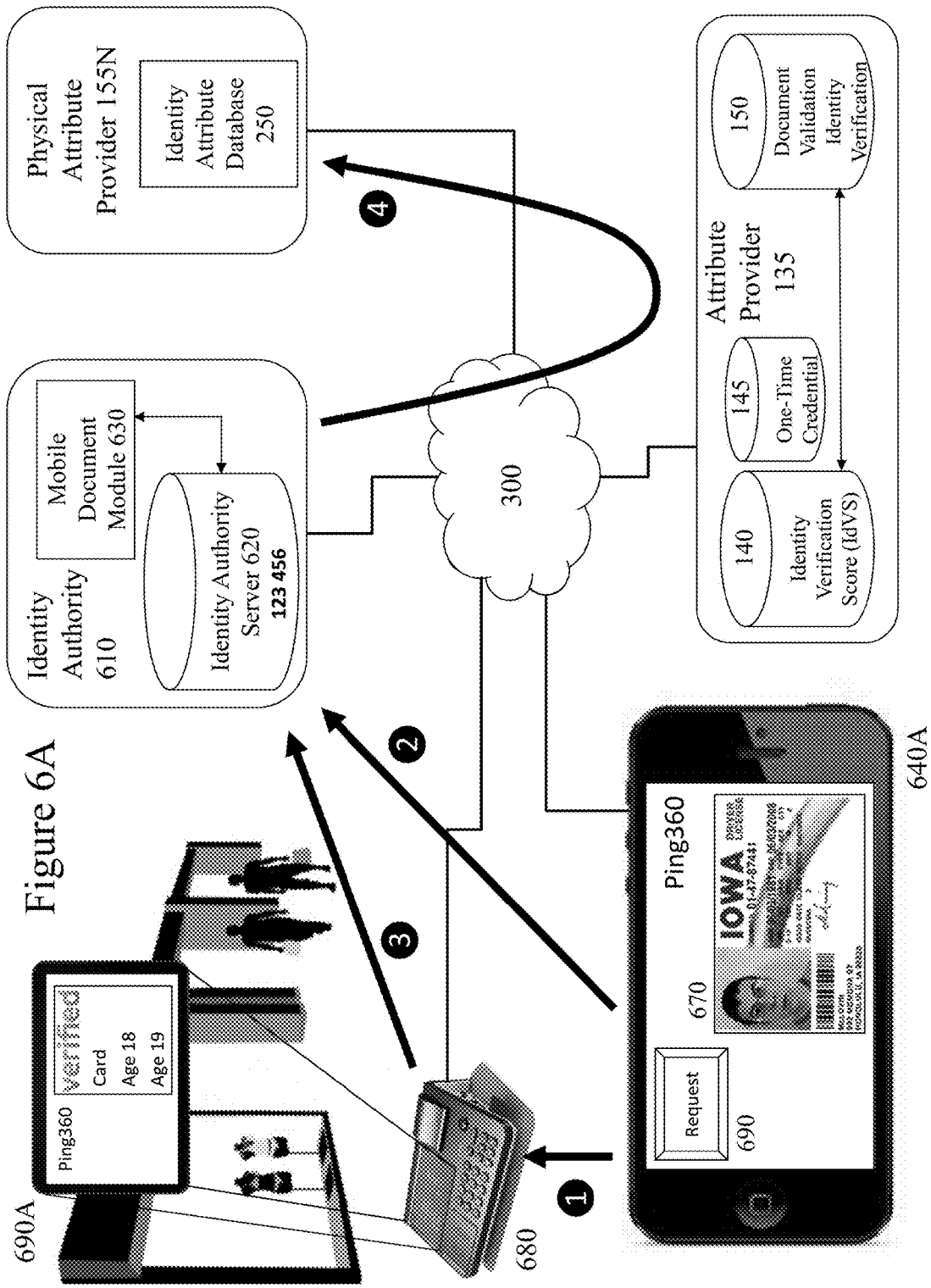
FIGS. 6A and 6B depict an exemplary process flow for establishing verification of a credential provided by a user within an environment according to an embodiment of the invention.
Figure 6B:
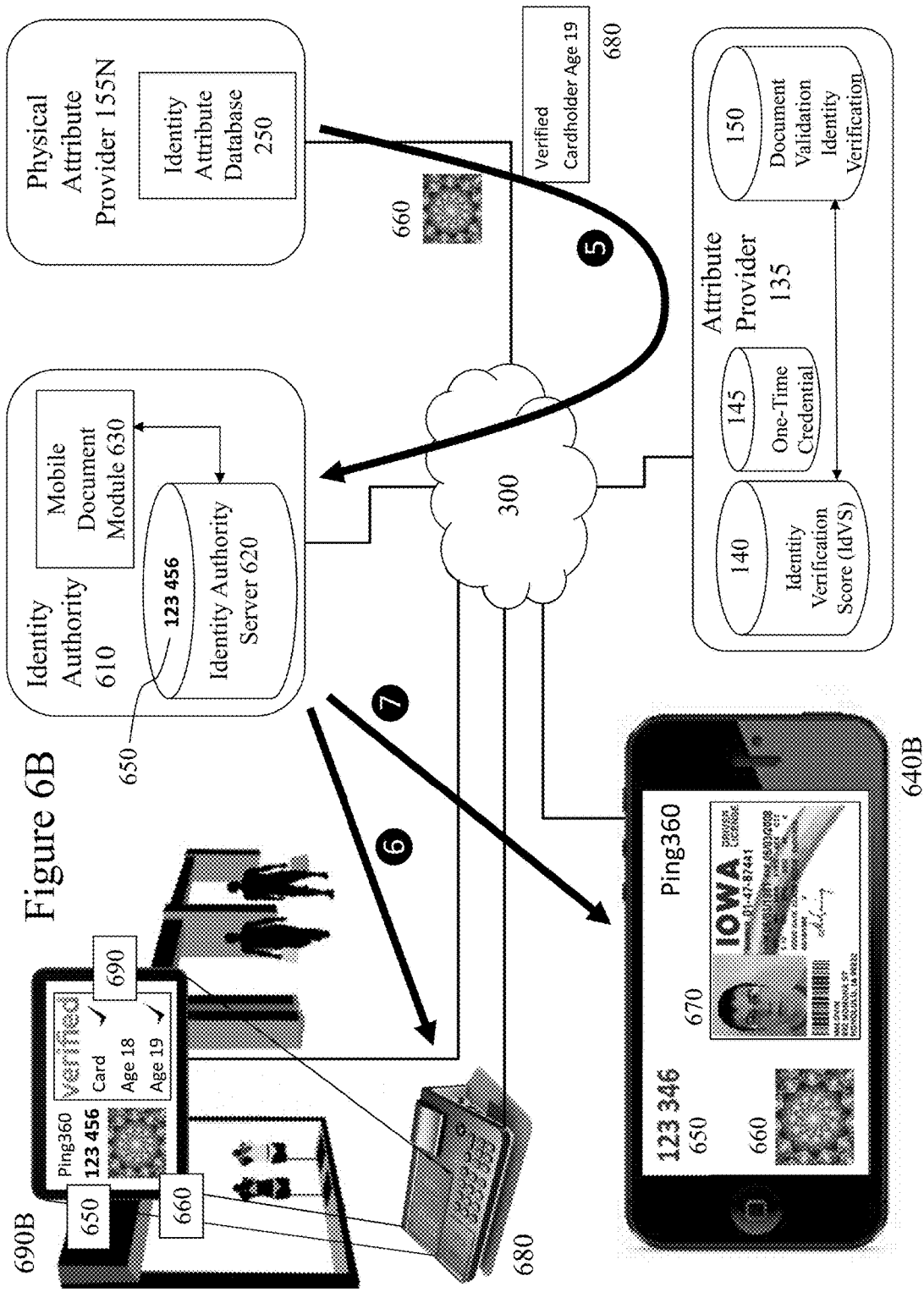

Accordingly, referring to FIGS. 6A and 6B there is depicted an exemplary process flow for establishing verification of a credential provided by a user within an environment according to an embodiment of the invention. As depicted the user has their PED in a first configuration 640A executing an EleID application (EleIDAp), for example a "Ping 360" application, wishes to make a purchase within a retail environment and accordingly approaches within the retail environment a Point of Sale (POS) terminal 680. As their purchase requires, for example, proof of age, then they select within the EleIDAp to display their driving license 670 and selects a "Request" button 690 within the EleIDAp. The user may activate the EleIDAp upon their PED by providing a password, personal identification number (PIN), biometric, another credential, or simply accessing the EleIDAp. In response to the "Request" button 690 a first message "1" is provided to the POS terminal 680 and a second message "2" is sent from the PED's first configuration 640A to an Identity Authority (IA) 610 which includes, but is not limited to, an Identity Authority Server (IAS) 620 and a Mobile Document Module 630. Based upon the first message "1" the POS terminal 680 transmits a request, third message "3", to the IA 610. The POS terminal 680 and user's PED communicating to the IA 610 via network 300.

Optionally, the first message "1" may be the presentation of the user's EleID displayed upon the PED's display in the first configuration 640A to a camera or other image captured device forming part of or associated with the POS terminal 680 or it may be information relating to the user associated with the EleID 670. The IA 610 then communicates via the network 300 with Attribute Provider 135 and PhysAP 155N, this being depicted as verification request "4." Via Attribute Provider 135 and PhysAP 155N the IA server validates the data provided within the validation request, which may be either derived from message "2" and/or request "3" or portions thereof.

The Attribute Provider 135 and PhysAP 155N through first response "5" communicates back to IA 610 data relating to the validation of the user's presented EleID including fractal 660 and verification data 680. The IA 610 then generates second and third responses "6" and "7" to the POS terminal 680 and user's PED. The user's PED, based upon receiving the third response "7", has transitioned to verify screen 640B wherein it displays the fractal 660, the EleID 670, and a unique code 650 which the IA 610 attached to its response to third message "3" which includes information contained within the first response "5." The second response "6" to the POS terminal 680 also includes the unique code 650, fractal 660, and verification data 690 allowing the retail clerk to quickly verify the required "proof-of-age" of the user. If verified, then the retail transaction can proceed using techniques as known within the prior art.

Use of the unique code 650 by the IA 610 prevents repeated use of a single first response "5" to validate multiple transaction verifications. The retail clerk may require the user to display their PED with verify screen 640B so that they can see that the fractal 660 and unique code 650 displayed upon it match the ones they have received.

Optionally, the fractal 660 may be transmitted directly to the POS terminal and to an electronic address bound to the user's identity. The EleIDAp would therefore be required to access this electronic address in order to obtain the fractal 660.

Optionally, the fractal 660 may be transmitted to the POS terminal only and the fractal 660 may be a fractal image embedded within the EleID as established during its generation. Such association of unique fractals with user PhysID and/or EleID being described by the inventors within U.S. Provisional Patent Application 62/086,745 entitled "Verifiable Credentials and Methods Thereof" filed Dec. 3, 2014 which is incorporated by reference herein.

Figure 7B:
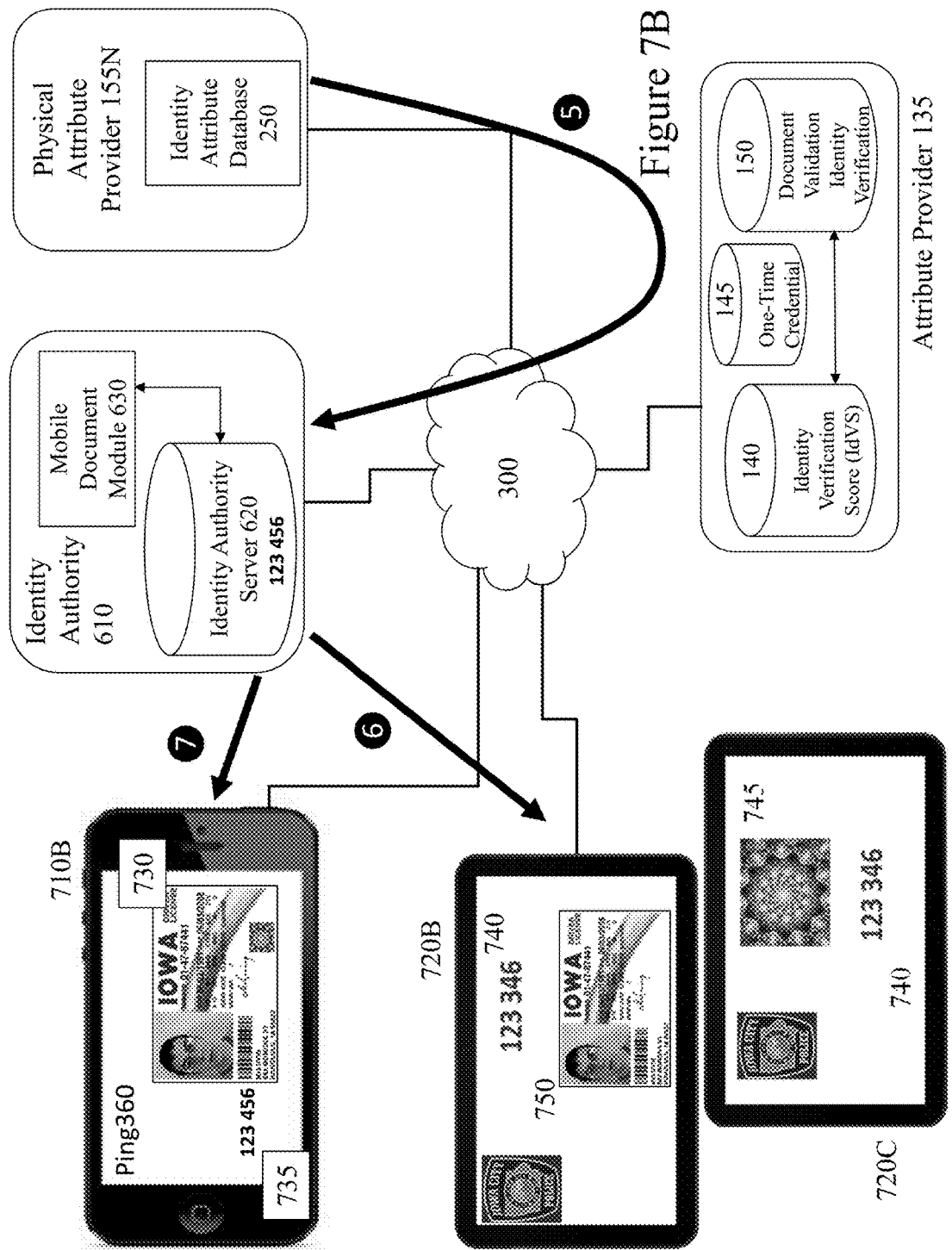

Now referring to FIGS. 7A and 7B there is depicted an exemplary process flow for establishing verification of a credential provided by a user within an environment according to an embodiment of the invention. In this instance, rather than a retail environment, the user is presenting their EleID in an external, i.e. mobile environment, such as, for example, presenting their electronic driving license to a police officer during a traffic stop, for example. Accordingly, the user as discussed supra in respect of FIG. 6A having been asked to provide their driving license has elected to present their EleID and activates the EleIDAp. The user may have only an EleID or in other instances they may be issued with an EleID and a PhysID when they verify themselves and obtain the credentials such as described above in respect of FIGS. 1 and 2. According, the user triggers through their interaction with the EleIDAp a first message "1" to the IA 610.

At the same time the EleIDAp displays a fractal 715 upon its display as depicted with first EleIDAp display 710A. This fractal 715 is then acquired by an official electronic device (OED) displayed in first OED configuration 720A. As displayed the OED is associated with the Iowa City Police Department. The fractal 715 may be acquired through the user's PED being held such that an image of the display may be captured by a camera within the OED. Alternatively, the OED and user's PED may pair through a local area network interface, e.g. Bluetooth or another interface such as Near Field Communications (NFC).

Optionally, the fractal 715 may be a fractal obtained from IA 610 in response to the first message "1." Optionally, the fractal 715 may include encrypted data. Optionally, the fractal 715 as displayed is pulsating and data relating to the pulse sequence of the fractal images presented acquired by the OED.

The OED may be executing a EleIDAp such as "Ping 360" in addition to specific software associated with the OED or the EleIDAp is an application embedded within the OED software. In either instance the OED generates a third message "3" which is transmitted to the IA 610. This may be the fractal 715 together with information associated with the OED or information extracted, i.e. decrypted, from the fractal 715 or acquired as part of the communications between OED and PED. Within an embodiment of the invention this information may include a one-time identification number embedded within the fractal 715, or a hash value of the one-time identification number. This one-time identification number and/or the fractal 715 may have been communicated by the IA 610 to the user's PED in response to the first message "1." Optionally, there may be a time limit associated with the timing of receipt of messages "1" and "3" by the IA 610.

Accordingly, the IA Server based upon the information extracted from the fractal 715 and/or information received with the message "3" establishes, through request "4" to Attribute Provider 135 and PhysAp 155N, personal information. This personal information is provided back to the IA 610 by Attribute Provider 135 and PhysAp 155N as first response "5". This response "5" may include appropriate identity attribute information relating to the PhysID and/or EleID as well as a representation of the PhysID and/or EleID.

Accordingly, the IA 610 generates second and third responses to the OED and PED respectively. In second response "6" the OED receives, based upon the appropriate privacy requirements of the user based upon identity information of the organization associated with the OED, appropriate information including a privacy compliant representation 750 of the PhysID and/or EleID, and a first unique identifier 740 provided from the IA Server 620 within the IA 610. As such the OED may display to the officer associated with the OED, as indicated by OED in second OED configuration 720B, wherein the privacy compliant representation 750 and unique identifier 740 are displayed. The officer associated with the OED can then compare these to the PhysID and/or EleID being offered by the user. In the instance of an EleID the third response "7" to the user's PED may trigger the EleIDAp in execution upon their PED, e.g. Ping 360 application, to display as displayed in second EleIDAp configuration 710B, the EleID 730 together with a second unique identifier 735 provided to them within third response "7." As such the EleIDAp in execution upon the user's PED provides information against which the officer with the information upon their OED can compare. As such the officer would be seeking to verify that the EleIDs match and the unique identifiers match. Optionally, as indicated within third OED configuration 720C the IA 610 may have communicated a second fractal 745 to the OED within second response "6." This second fractal 745 may for example be a fractal associated with the PhysID and/or EleID and bound to it at issuance (optionally this is also part of the PhysID and/or EleID. Optionally, the fractal, representation of PhysID and/or EleID, and unique identifier may be provided upon the OED.

Optionally, the EleID and/or a representation of the PhysID may be modified, i.e. redacted, in order to meet the appropriate privacy requirements which may be determined in dependence upon several factors including, but not limited to, the age of the user, the requesting third party, the jurisdiction of issuance of the EleID/PhysID, the jurisdiction of the third party requesting verification, and an activity associated with the verification process.

Within the embodiments of the invention described above an application and/or applications are described as being in operation upon the user's PED, retailer POS terminals, and mobile OEDs etc. Within other embodiments of the invention these may be replaced with the use of mobile web application(s) such that nothing is physically loaded upon the PED, retailer POS terminal, mobile OED, etc. except as necessary to execute the web based application and/or display the required information on the associated displays with these electronic devices and/or systems.

Within embodiments of the invention the user's PED may provide to another electronic device and/or system a unique identifier, e.g. text, image, fractal, encrypted content, etc., which triggers and/or permits the downloading of an electronic representation of the PhysID and/or EleID. Optionally, the user's PED may download this electronic representation of the PhysID and/or EleID to the user's PED based upon a requester (hereinafter Requester), e.g. police officer, entering a code into the EleIDAp in execution upon or accessed as a web application. This electronic representation of the PhysID and/or EleID being concurrently downloaded to the Requester's electronic device, e.g. OED, allowing them to verify the identity of the user. Within embodiments of the invention the entry of the Requester's code may be based upon entry of a code generated at that point in time such as employed in the prior art in generating security key information for online security applications etc. This code may be triggered by an action of the Requester with respect to their own PED, a wearable device, etc. Optionally, a wearable device may be continually generating such codes and the association of the user's PED with the wearable device results in the capture of the code and its use. Such techniques, as well as others known in the art, would prevent theft of a code associated with a police officer, for example, by use by a third party.

Optionally, a user may request a download of their PhyID and/or EleID from the IA 610 where in they are provided to their PED a unique image and a PIN number. The Requester is given the 6-digit PIN number by the mobile device holder, i.e. the user. The Requester, who is an accredited user of an application authorised to access the IA 610, provides this PIN number, within a specified time frame, on a request page and the user's EleID and/or PhysID representation is downloaded onto the Requester's FED and/or PED along with the unique image.

Within the embodiments of the invention presented supra the EleID and PhysID have been described with respect to verification/authentication back to a TL1 issuing authority, e.g. Government department such as associated with passports, driving licenses, etc. However, in other embodiments of the invention binding of identities to a user may be performed at a lower trust level but are not, generally, associated with the issuance of a EleID/PhysID relating to a TL1 type issuing authority although this may not be excluded. Consider, for example a user seeking to access medical services, which are a common source of identity fraud. In this instance, the user may present their medical card which identifies them as having a certain level of medical healthcare insurance, e.g. BlueCross, Medicare, Medicaid etc. In doing so this medical card may be scanned, e.g. using a Ping360, and data/imagery captured from it. The user may be required at the same time, in order to provide additional identity verification, be required to provide their driver's license and/or passport which would also be scanned, again for example, using the Ping360, and then have their photograph taken. Accordingly, these additional documents can be verified based upon embodiments of the invention such as described above to their issuing authority or an intermediate verification authority. In the event that one or more of these credentials does not match the medical card then, in most instances, a fraud is being attempted and can be stopped prior to provisioning of medical services, prescription, etc. At the same time as the user's photograph is taken then even where all documents have been tampered with then their identity is captured.

Within the descriptions supra in respect of FIGS. 1 to 7B and other descriptions embodiments of the invention are presented with respect to providing verification of an individual to a third party by providing to the third party a representation of an originally issued identity document associated with information provided by the individual during the verification process. Accordingly, the third party receives a representation of the originally issued identity document, for example one or more portions a the originally issued identity document, that the third party can employ to verify the version of the originally issued identity document held by the user and offered as proof of identity. Within many embodiments of the invention the user and third party are employing mobile (portable) electronic devices coupled to one or more networks via one or more wireless interfaces.

These networks and/or interfaces may include standard wireless telecommunications such as GSM, 4G, etc. as provided through national carriers such as AT&T, Verizon, etc. in the United States, or Orange, O2, Vodafone, etc. in Europe, etc. Within the PEDs associated with such networks a subscriber identity module (SIM, commonly referred to as a SIM card) provides a unique serial number (ICCID), an international mobile subscriber identity (IMSI) number, security authentication and ciphering information, temporary information related to the local network, a list of the services the user has access to, and two passwords: a personal identification number (PIN) for ordinary use, and a personal unblocking code (PUK) for PIN unlocking. Accordingly, embodiments of the invention may exploit these security authentications and ciphering information as part of the process of transferring authentication information to the identity server etc. through digitally signed transmissions.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of providing verification of an individual to a third party by providing to the third party a representation of an originally issued identity document associated with information provided by the individual during the verification process comprising:

providing to a first electronic device first credential information relating to the individual associated with the first electronic device; the first credential information authorizing submission of a first message to a remote server;

transmitting first data from the first electronic device to the remote server, the first data comprising an authorization to submit information derived from the originally issued identity document to a second device associated with the third party;

transmitting second data from the first electronic device to the remote server, the second data comprising second credential information needed to complete independent verification of the first data by the remote server;

the remote server cryptographically combining the first data and the second data to generate a result and using the result to locate a matching verification entry in a database or similar data storage entity;

in response to locating the match of verification entry, delivering third data by the remote server to a second electronic device associated with the third party, the third data consisting of the information derived from the originally issued identity document required by the third party; and denying delivering the third data when the matching verification entry cannot be located.

2. The method according to claim 1 wherein:
the first data is comprised of at least one of:
an image of the originally issued identity document;
a digital representation of the originally issued identity document;
a privacy policy compliant redacted image of the originally issued identity document;
a privacy policy compliant redacted digital representation of an originally issued identity document; and
a predetermined portion of data stored by the issuer of the originally issued identity document.

3. The method according to claim 1 wherein:
The second data is at least one of:
cipher data stored within one or more identity modules on the first device; and
a unique cipher key stored on the first device.

4. The method according to claim 1 wherein:
the third data is at least one of:
an image of the originally issued identity document;
a digital representation of the originally issued identity document;
a privacy policy compliant redacted image of the originally issued identity document;
a privacy policy compliant redacted digital representation of an originally issued identity document
a predetermined portion of data stored by the issuer of the originally issued identity document;
a reformatted version of a predetermined portion of data obtained from an image of the originally issued identity document,
a reformatted version of a predetermined portion of data obtained from a digital representation of the originally issued identity document; and
a reformatted version of a predetermined portion of data stored by the issuer of the originally issued identity document.

5. The method according to claim 1 wherein:
the method terminates upon the occurrence of one of:
the remote server does not acknowledge receipt of the first data within a predetermined time period after the first electronic device transmits the first data; and
the remote server fails to find a matching verification entry in the database or similar data storage entity.

6. The method according to claim 1 wherein:
communication to the remote server from the first electronic device associated with the individual and from the remote server to the second device associated with the third party are encrypted with ciphering processes exploiting cipher data stored within subscriber identity modules on the first or second devices.

7. The method according to claim 1 wherein:
the verification entries stored in the database or similar data storage entity consist of at least one of:
information stored by an issuer of the first data in a corresponding database;
cryptographically secured representations of the first data verified by the issuer of the originally issued identity document; and
cryptographically secured representations of the first data verified by another authority.

8. The method according to claim 1 wherein:
the database or similar storage entity consists of at least one of:
a public or private blockchain, public or private asset chain, or other public or private immutable distributed ledger technology;
a set of public or private asset chains; and
any other public or private immutable distributed ledger technology.

9. A method of providing identity payment authorization information by an individual to a third party comprising:
providing to a first electronic device first credential information relating to the individual associated with the first electronic device; the first credential information authorizing submission of a first message to a remote server;
the first electronic device cryptographically creating one or more randomly generated representations of financial account information that represent actual financial account numbers and other financial account identifying information required for transaction in progress;
transmitting first data from the first electronic device to the remote server, the first data comprising an authorization to submit information derived from the originally issued identity document and financial account information to both a server operated by payment provider with which the individual has an account and to a second device associated with a third party that requires payment and/or, identity information;
transmitting second data from the first electronic device to the remote server, the second data comprising second credential information needed to complete independent verification of the first data by the remote server;
the remote server cryptographically combining first data and second data to generate a result and using the result to locate a matching verification entry in a database or similar data storage entity;
in response to locating the matching verification entry, delivering third data from the remote server to the server operated by a the payment provider, third data consisting of identification information, information to identify the selected payment account, and the one or more randomly generated representations of account information as actual account numbers or other account related details for the duration of the transaction;
transmitting fourth data from the first device associated with the individual to a second electronic device associated with the third party, the fourth data consisting of the information derived from the originally issued identity document required by the third party and the one or more randomly generated representations of account information as actual account numbers or other account related details;
denying delivering the third data and the fourth data when the matching verification entry cannot be located;
upon completion of the transaction, transmitting fifth data from the remote server to the first electronic device associated with the individual, the second electronic device associated with the third party, and the server associated with the payment processor, the fifth data consisting of a record of the completed transaction; and
the remote server cryptographically combining fifth data and second data to generate a sixth data and using the sixth data to write an entry in the database or similar data storage entity;
wherein the payment provider comprises at least one of: a financial institution, a payment service, a payment facilitator that interacts with such financial institution or payment service on behalf of the individual.

10. The method according to claim 9 wherein:
the first data consists of:
information identifying the financial account to be used for this transactions along with the randomly generated representations of financial account information that will represent the actual financial information for this transaction;
and also includes at least one of:
an image of the originally issued identity document;
a digital representation of the originally issued identity document;
a privacy policy compliant redacted image of the originally issued identity document;
a privacy policy compliant redacted digital representation of an originally issued identity document; and
a predetermined portion of data stored by the issuer of the originally issued identity document.

11. The method according to claim 9 wherein:
The second data is at least one of:
  cipher data stored within one or more identity modules on the first device; and
  a unique cipher key stored on the first device.

12. The method according to claim 9 wherein:
the third data consists of:
  evidence that the individual requesting access to a financial account has presented authentic identity information to satisfy the financial institution's requirements for identity verification;
and also includes:
  information identifying the financial account used for transactions along with the randomly generated representations of financial account information representing the actual financial information for this transaction;
and also includes at least one of:
  an image of the originally issued identity document;
  a digital representation of the originally issued identity document;
  a privacy policy compliant redacted image of the originally issued identity document;
  a privacy policy compliant redacted digital representation of an originally issued identity document; and
  a predetermined portion of data stored by the issuer of the originally issued identity document.

13. The method according to claim 9 wherein:
the fourth data consists of:
  the randomly generated representations of financial account information used for the transaction; and
at least one of:
  an image of the originally issued identity document;
  a digital representation of the originally issued identity document;
  a privacy policy compliant redacted image of the originally issued identity document;
  a privacy policy compliant redacted digital representation of an originally issued identity document; and
  a predetermined portion of data stored by the issuer of the originally issued identity document.

14. The method according to claim 9 wherein:
the fifth data consists of:
  a transaction identifier generated by the remote server uniquely representing the transaction;
and at least one of:
  an image of the originally issued identity document;
  a digital representation of an originally issued identity document;
  a privacy policy compliant redacted image of the originally issued identity document;
  a privacy policy compliant redacted digital representation of an originally issued identity document;
  a predetermined portion of data stored by the issuer of the originally issued identity document;
  information delivered in the third data identifying the financial account used in this transaction; and
  the randomly generated representations of financial account information used for the transaction.

15. The method according to claim 9 wherein:
the method terminates upon the occurrence of one of:
  the remote server does not acknowledge receipt of first data within a predetermined time period after first device transmits the first data;
  the remote server fails to find a matching verification entry in the database or similar data storage entity;
  the payment provider does not acknowledge receipt of third data within a predetermined time period after the remote server transmits the third data; or
  the payment provider rejects the request represented by third data for any reason.

16. The method according to claim 9 wherein:
communications to the remote server from the first device associated with the individual and/or from the remote server to the second device associated with the third party and/or from the remote server to the payment provider are encrypted with ciphering processes exploiting cipher data stored within subscriber identity modules on the first or second devices.

17. The method according to claim 9 wherein:
the verification entries stored in the database or similar data storage entity consist of at least one of:
  information stored by an issuer of the information represented in the first data in its own database;
  cryptographically secured representations of the information represented in the first data verified by the issuer of the originally issued identity document; and
  cryptographically secured representations of the information represented in the first data verified by another authority.

18. The method according to claim 9 wherein:
the database or similar storage entity consists of at least one of:
  a public or private blockchain, public or private asset chain, or other public or private immutable distributed ledger technology;
  a set of public or private asset chains; and
  any other public or private immutable distributed ledger technology.

* * * * *